(12) United States Patent
Miyashita et al.

(10) Patent No.: US 7,513,980 B2
(45) Date of Patent: Apr. 7, 2009

(54) ELECTROLYTIC CELL FOR ELECTROLYZED WATER GENERATOR

(75) Inventors: Kohichi Miyashita, Wako (JP); Go Muto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 409 days.

(21) Appl. No.: 11/284,030

(22) Filed: Nov. 22, 2005

(65) Prior Publication Data

US 2006/0108216 A1 May 25, 2006

(30) Foreign Application Priority Data

Nov. 25, 2004 (JP) ............................... 2004-339889
Nov. 25, 2004 (JP) ............................... 2004-339892

(51) Int. Cl.
*C25B 9/10* (2006.01)

(52) U.S. Cl. ....................... 204/263; 204/253; 204/255; 204/257

(58) Field of Classification Search .................. 204/252, 204/253, 255, 257, 263
See application file for complete search history.

(56) References Cited

U.S. PATENT DOCUMENTS

| | | | | |
|---|---|---|---|---|
| 4,210,501 A | * | 7/1980 | Dempsey et al. | 205/620 |
| 4,331,521 A | * | 5/1982 | Chisholm et al. | 205/521 |
| 7,037,618 B2 | * | 5/2006 | Andrews et al. | 429/37 |

FOREIGN PATENT DOCUMENTS

| | | |
|---|---|---|
| JP | 61-28493 A | 2/1986 |
| JP | 8-332486 A | 12/1996 |
| JP | 11-333458 A | 12/1999 |
| JP | 2001-073177 | 3/2001 |
| JP | 2005-144239 | 6/2005 |
| JP | 2005-144240 | 6/2005 |

* cited by examiner

*Primary Examiner*—Bruce F Bell
(74) *Attorney, Agent, or Firm*—Arent Fox LLP

(57) ABSTRACT

An electrolytic cell 1 comprises electrolysis chambers 5 and 6 arranged opposite to each other through a diaphragm 11, raw water feed means 8 and 7, electrodes 12a and 12b arranged in the electrolysis chambers 5 and 6 in a manner sandwiching the diaphragm 11, and electrolyzed water take-out means 9 and 10 for taking out electrolyzed water obtained by electrolyzing raw water. The electrolytic cell 1 comprises a membrane-electrode assembly 2 formed so as to cause the electrodes 12a and 12b to respectively adhere to both surfaces of the diaphragm 11, mesh current collectors 13 and 14 respectively arranged opposite to the electrodes 12a and 12b, and a plurality of protrusions 15 and 16. The electrolytic cell 1 comprises connecting members 17 and 18 connecting the mesh current collectors 13 and 14 to an external electric power supply in a manner penetrating the outer walls of the electrolysis chambers 5 and 6, and resilient members 25 for energetically pressing the connecting members 17 and 18 toward the mesh current collectors 13 and 14. The electrolytic cell 1 comprises a plurality of the protrusions 15 and 16, and the connecting members 17 and 18, respectively at positions opposite to each other on both sides of the membrane-electrode assembly 2. The current collectors 13 and 14 are formed of a corrosion resistant conductive material. The electrodes 12a and 12b are formed of a porous material containing a conductive powder.

9 Claims, 5 Drawing Sheets

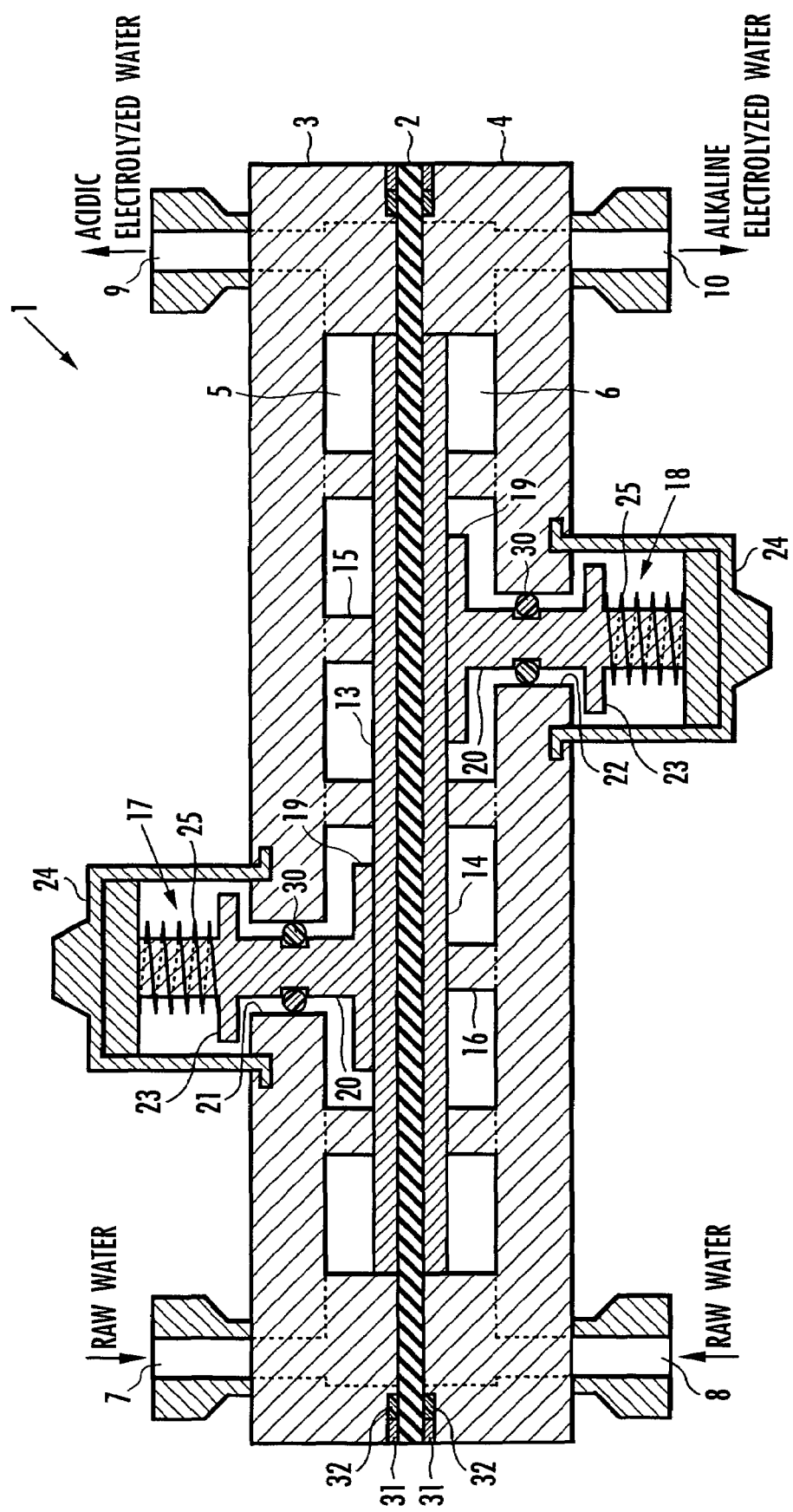

ELECTROLYTIC CELL FOR ELECTROLYZED WATER GENERATOR

BACKGROUND OF THE INVENTION

1. Field of the Invention

The present invention relates to an electrolyzed water generator which produces acidic and alkaline electrolyzed water, by electrolyzing raw water fed into a pair of electrolysis chambers arranged opposite to each other through an ion permeable diaphragm, and by applying a voltage to a pair of electrodes respectively arranged in the electrolysis chambers in a manner sandwiching the diaphragm. More specifically, the present invention relates to an electrolytic cell in the electrolyzed water generator.

2. Description of the Related Art

There is known an electrolyzed water generator which produces electrolyzed water by use of an electrolytic cell comprising a pair of electrolysis chambers arranged opposite to each other through an ion permeable diaphragm and a pair of electrodes respectively arranged in the electrolysis chambers in a manner sandwiching the diaphragm. In the electrolyzed water generator, electrolyte-containing raw water is fed into each of the electrolysis chambers, the raw water is electrolyzed by applying a voltage to the pair of electrodes, and consequently, acidic electrolyzed water can be produced in the anodic electrolysis chamber, and on the other hand, alkaline electrolyzed water can be produced in the cathodic electrolysis chamber.

In the electrolytic cell in the electrolyzed water generator, the electrodes are each arranged usually with a space from the diaphragm. However, in this structure, the electrodes arranged in a manner sandwiching the diaphragm are separated from each other with a large space therebetween, and hence the electric resistance between the electrodes is large, resulting in a problem that the electrolysis efficiency in relation to the applied electric power is low.

For the purpose of solving the above described problem, for example, there has been proposed an electrolytic cell in which the electrodes are separated from each other with a reduced space by bringing the diaphragm into contact with the electrodes each formed by laminating a porous electrode material made of a plain-woven wire mesh and a punched metal sheet (for example, see Japanese Patent Laid-Open No. 2001-73177). According to this electrolytic cell, raw water is made to circulate inside the porous electrode material, and consequently the contact area between the raw water and each of the electrodes can be made large. In addition, according to this electrolytic cell, the electrolysis efficiency can be improved to some extent in relation to the applied electric power.

However, in the electrolytic cell disclosed in the above publication, the circulation resistance is large, and hence when the amount of electrolyzed water produced in a unit time is increased, the equipment concerned inevitably becomes large in size. The mentioned large circulation resistance is caused by the fact that raw water is made to circulate inside the porous electrode material.

Under these circumstances, the present inventors have proposed an electrolytic cell in which a pair of electrodes are formed so as to respectively adhere to both surfaces of an ion permeable diaphragm, and there is used a membrane-electrode assembly in which the electrodes themselves are provided with ion permeability (see Japanese Patent Laid-Open Nos. 2005-144239 and 2005-144240). According to the membrane-electrode assembly, only the diaphragm intervenes between both electrodes, so that the electrolysis efficiency in relation to the applied electric power can be enhanced, and in addition, the equipment can be downsized.

However, in the above described membrane-electrode assembly, it is not easy to connect lead wires to the electrodes, and it is not easy to supply electric power through the lead wires. It is possible to make current collectors, in place of the lead wires, in contact with the surfaces of the electrodes. However, when the electrodes are formed of a porous material having fine pores, namely, so-called a microporous material, the surface resistance of the electrodes is high. Accordingly, even when the current collectors are brought into contact with the electrode surfaces, it is not easy to supply electric power from the current collectors to the electrodes, and hence further improvement is desired.

SUMMARY OF THE INVENTION

An object of the present invention is to provide an electrolytic cell for electrolyzed water generator which can overcome such problems as described above and surely supply sufficient electric power to the electrodes of a membrane-electrode assembly.

For the purpose of achieving the above described object, the present invention provides an electrolytic cell for electrolyzed water generator, comprising a pair of electrolysis chambers arranged opposite to each other through an ion permeable diaphragm, raw water feed means for feeding raw water into each of the electrolysis chambers, a pair of electrodes respectively arranged in the electrolysis chambers in a manner sandwiching the diaphragm, and electrolyzed water take-out means for taking out electrolyzed water obtained by electrolyzing the raw water fed into each of the electrolysis chambers through the raw water feed means by applying a voltage to both electrodes from each of the electrolysis chambers, the electrolytic cell comprising a membrane-electrode assembly formed with each of the electrodes adhered to each surface of the diaphragm, mesh current collectors arranged respectively opposite to the electrodes of the membrane-electrode assembly, and a plurality of protrusions that are respectively arranged on the inner walls of the electrolysis chambers, and press the mesh current collectors toward the electrodes so as to bring the mesh current collectors into pressure contact with the electrodes.

In the electrolytic cell of the present invention, by bringing the current collectors into contact with the electrodes, electric power is applied from the current collectors to the electrodes. The current collectors are mesh shaped, and accordingly allow raw water to pass through them and to be brought into contact with the electrodes, so that the current collectors give no adverse effects on the electrolysis.

In the electrolytic cell of the present invention, a plurality of the protrusions respectively arranged on the inner walls of the electrolysis chambers respectively press the mesh current collectors toward the electrodes so as to bring the mesh current collectors into pressure contact with the electrodes. Consequently, according to the electrolytic cell of the present invention, the contact areas of the mesh current collectors in relation to the electrodes of the membrane-electrode assembly are large, electric power is thereby uniformly supplied to the electrodes, and sufficient electric power can be surely supplied from the current collectors to the electrodes.

The protrusions arranged on the inner walls of the electrolysis chambers form the flow channels for the electrolyzed water inside the electrolysis chambers, and are formed in island shapes in the flow channels for the electrolyzed water, so that the protrusions can improve the effect of diffusing the ions in the electrolyzed water.

In the electrolytic cell of the present invention, the electrolysis chambers comprise a plurality of the protrusions respectively arranged at positions opposite to each other on the both sides of membrane-electrode assembly. The arrangement of a plurality of the protrusions respectively at positions opposite to each other on both sides of the membrane-electrode assembly makes it possible to avoid application of a local pressure only to one side of the current collectors. Consequently, both current collectors are pressed at a uniform pressure toward the membrane-electrode assembly so as to be surely brought into contact with the membrane-electrode assembly, so that electric power can be more surely supplied from the current collectors to the electrodes.

The electrolytic cell of the present invention comprises connecting members for connecting the mesh current collectors to an external electric power supply in a manner penetrating the outer walls of the electrolysis chambers, and resilient members for biasing the connecting members toward the mesh current collectors so as to bring the mesh current collectors into pressure contact with the electrodes.

In this case, in the electrolytic cell of the present invention, the connecting members are biased toward the mesh current collectors, and press the mesh current collectors toward the mesh current collectors by the resilient members, and consequently the mesh current collectors are pressed to be brought into contact with the electrodes. Consequently, according to the electrolytic cell of the present invention, the contact areas of the mesh current collectors in relation to the electrodes of the membrane-electrode assembly are large, and electric power is uniformly supplied to the electrodes, and consequently, sufficient electric power can be surely supplied from the current collectors to the electrodes.

In the electrolytic cell of the present invention, the arrangement of the connecting members makes it possible to easily connect the current collectors to an external electric power supply and to make the structure of the equipment simpler, so that operations such as assembling and maintenance can be easily carried out.

In the electrolytic cell of the present invention, the electrolysis chambers preferably comprise the connecting members respectively at positions opposite to each other on both sides of the membrane-electrode assembly. The arrangement of the connecting members respectively at positions opposite to each other on both sides of the membrane-electrode assembly makes it possible to avoid application of a local pressure only to one of the current collectors. Consequently, both current collectors are pressed at a uniform pressure toward the membrane-electrode assembly so as to be surely brought into contact with the membrane-electrode assembly, so that electric power can be more surely supplied from the current collectors to the electrodes.

In the electrolytic cell of the present invention, the current collectors are formed of a corrosion resistant conductive material. Examples of the corrosion resistant conductive material may include titanium. The formation of the current collectors with a corrosion resistant conductive material can make the operation life of the current collectors themselves longer, and also avoid adverse effects on the electrolysis such as voltage elevation caused by the deterioration of the current collectors.

In the electrolytic cell of the present invention, the electrodes are formed of a porous material comprising a conductive powder. Because the electrodes are the above described a porous material, the electrodes allow raw water to pass through the electrodes and to be brought into contact with the diaphragm even when the whole surface of the diaphragm is covered with the electrodes, so that the functions of the diaphragm are not inhibited and sufficient ion exchange function can be attained.

Because the electrodes are such a porous material as described above, the contact area of the electrodes with raw water is large and accordingly the electrolysis efficiency can be improved.

BRIEF DESCRIPTION OF THE DRAWINGS

FIG. 5 is a schematic sectional view illustrating another example of the structure of the electrolytic cell of the present invention.

DETAILED DESCRIPTION OF THE PREFERRED EMBODIMENTS

Example

The embodiment of the present invention will be described below in detail with reference to the accompanying drawings.

Figure 1:
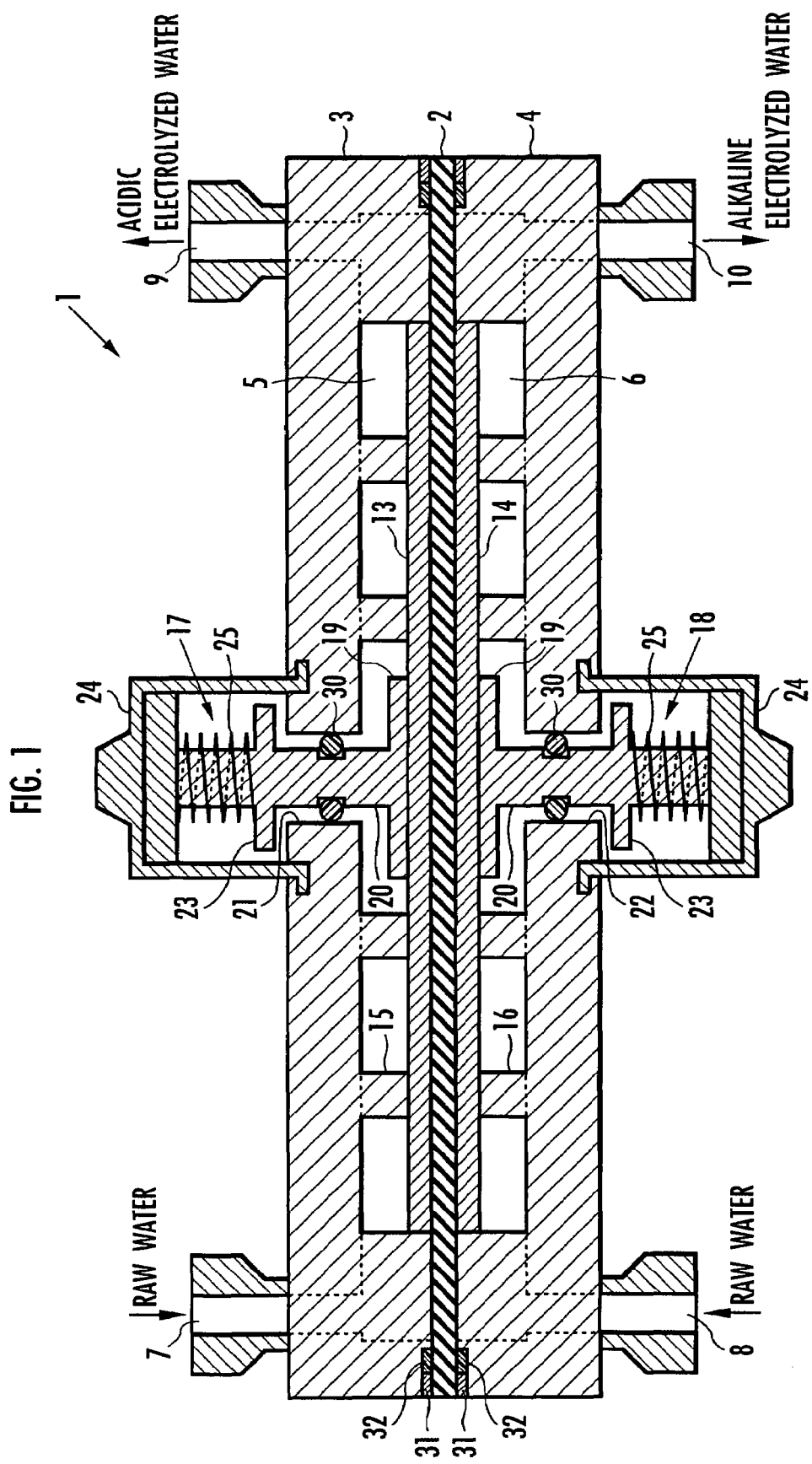
FIG. 1 is a schematic sectional view illustrating an example of the structure of the electrolytic cell of the present invention.

An electrolytic cell 1 of the present invention is to be used in electrolyzed water generator, and comprises as shown in FIG. 1 a membrane-electrode assembly 2, and electrolysis chamber cases 3 and 4 sandwiching the membrane-electrode assembly 2, wherein the electrolysis chamber cases 3 and 4 comprise thereinside electrolysis chambers 5 and 6, respectively. Consequently, in the electrolytic cell 1, a pair of electrolysis chambers 5 and 6 is arranged opposite to each other through the membrane-electrode assembly 2.

The electrolysis chamber cases 3 and 4 comprise respectively raw water feed ports 7 and 8 for feeding raw water respectively to the electrolysis chambers 5 and 6, and electrolyzed water take-out ports 9 and 10 for taking electrolyzed water respectively out of the electrolysis chambers 5 and 6. The raw water feed ports 7 and 8 a reconnected to unshown raw water feed means such as a raw water tank, and the electrolyzed water take-out ports 9 and 10 are connected to unshown water storage tanks or the like.

Figure 2:
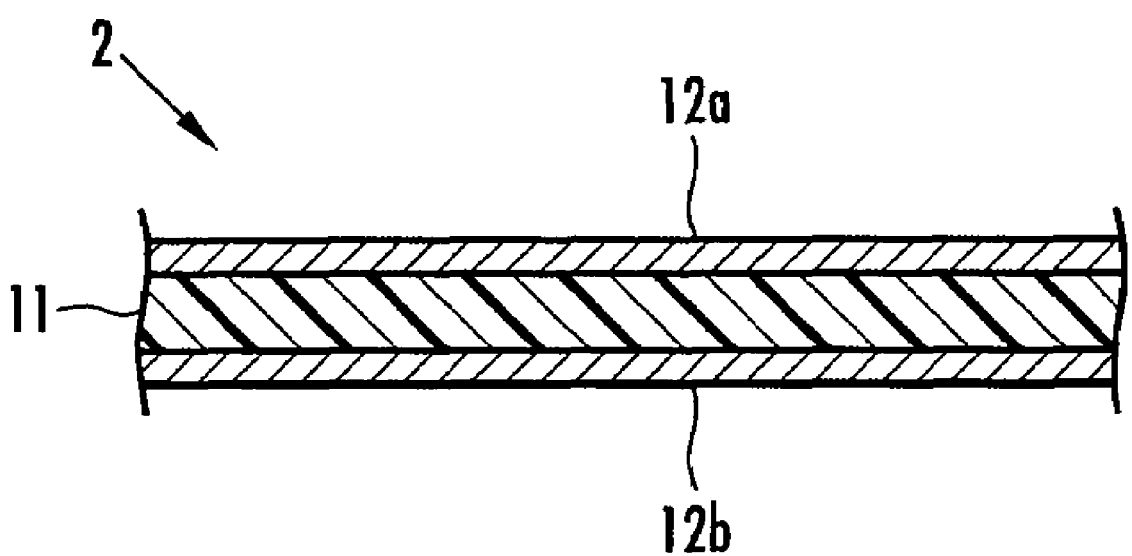
FIG. 2 is an enlarged view of a relevant portion of FIG. 1.

As shown in FIG. 2, the membrane-electrode assembly 2 comprises a structure in which film-like electrodes 12$a$ and 12$b$ are formed on both surfaces of an anion exchange membrane 11, wherein, for example, the electrode 12$a$ is arranged at a specified position in the electrolysis chamber 5, and the electrode 12$b$ is arranged at a specified position in the electrolysis chamber 6. Consequently, the electrolytic cell 1 comprises the pair of electrodes 12$a$ and 12$b$ arranged in the electrolysis chambers 5 and 6 in a manner sandwiching the anion exchange membrane 11.

Examples usable as the anion exchange membrane 11 may include anion exchange membranes made of hydrocarbon polymers such as Aciplex (trademark) manufactured by Asahi Kasei Corp. and Selemion (trade mark) manufactured by Asahi Glass Co., Ltd., and fluoropolymer anion exchange membranes such as Flemion (trade mark) manufactured by Asahi Glass Co., Ltd.

The electrodes 12$a$ and 12$b$ are formed of a paste-like material prepared as follows: a conductive powder is mixed with a metal powder, a solution mixture is prepared by dissolving polyvinyl alcohol in a mixed solvent composed of water and alcohol, and then the mixed powder thus obtained and the solution mixture thus obtained are mixed together to yield the paste-like material. The electrodes 12a and 12b are formed so as to adhere to the anion exchange membrane 11 to be integrated as a single piece with the anion exchange membrane 11 by coating both surfaces of the anion exchange membrane 11 with the paste-like material so as for the coatings on both surfaces to form predetermined shapes, and by thereafter heating and pressurizing the thus obtained membrane having the coatings.

Examples of the conductive powder may include carbon black, and examples of the metal powder may include platinum powder and iridium powder. The metal powder is mixed in a content of, for example, 5 wt % in relation to the conductive powder.

The electrodes 12a and 12b are formed of the conductive powder and the metal powder, and accordingly are a porous material having pores of a few μm in diameter, namely, so-called a microporous material. It is to be noted that polyvinyl alcohol is used as a binder in the paste-like material.

In the membrane-electrode assembly 2, the anion exchange membrane 11 has a thickness of 50 to 200 μm. The electrodes 12a and 12b each are formed so as to have a dry thickness of 30 to 200 μm.

Inside the electrolysis chambers 5 and 6, current collectors 13 and 14 are arranged opposite to each other respectively on the surfaces of the membrane-electrode assembly 2. The current collectors 13 and 14 each are formed of a corrosion resistant material such as titanium in a mesh-like shape, and consequently the raw water fed into the electrolysis chambers 5 and 6 can pass through the current collectors to be brought into contact with the electrodes 12a and 12b. Examples of the mesh current collectors 13 and 14 may include current collectors made of titanium mesh.

The electrolysis chamber cases 3 and 4 comprise a plurality of protrusions 15 and 16 respectively arranged on the inner walls of the electrolysis chambers 5 and 6. A plurality of the protrusions 15 and 16 are arranged respectively at positions opposite to each other on both sides of the membrane-electrode assembly 2, and the flat tips of the protrusions 15 and the flat tips of the protrusions 16 are respectively brought into contact with the current collectors 13 and 14. Consequently, a plurality of the protrusions 15 and 16 respectively press the current collectors 13 and 14 toward the electrodes 12a and 12b so as to bring the current collectors 13 and 14 into pressure contact respectively with the electrodes 12a and 12b.

The electrolysis chamber cases 3 and 4 comprise terminals 17 and 18 respectively brought into contact with the current collectors 13 and 14 in a manner penetrating the outer walls of the electrolysis chambers 5 and 6. The terminals 17 and 18 function as connecting members for connecting the current collectors 13 and 14 to an unshown external electric power supply.

The terminals 17 and 18 comprise flat contact portions 19 respectively brought into contact with the current collectors 13 and 14, and shanks 20 arranged on the back sides of the contact portions 19, and the shanks 20 are respectively made to pass through through-holes 21 and 22 respectively drilled in the electrolysis chamber cases 3 and 4. The terminals 17 and 18 comprise flanges 23 arranged on the outer peripheries of the portions of the shanks 20 respectively protruding outside the electrolysis chamber cases 3 and 4 in a manner forming clearances between one of the flanges 23 and the electrolysis chamber case 3 and between the other flange 23 and the electrolysis chamber 4. The terminals 17 and 18 are biased respectively toward the current collectors 13 and 14 by springs 25 placed between one of the flanges 23 and the inner surface of one of the caps 24 and between the other flange 23 and the inner surface of the other cap 24, wherein the caps 24 are arranged outside and latched respectively to the electrolysis chamber cases 3 and 4, and thus the terminals 17 and 18 are pressed respectively toward the current collectors 13 and 14.

Figure 3:
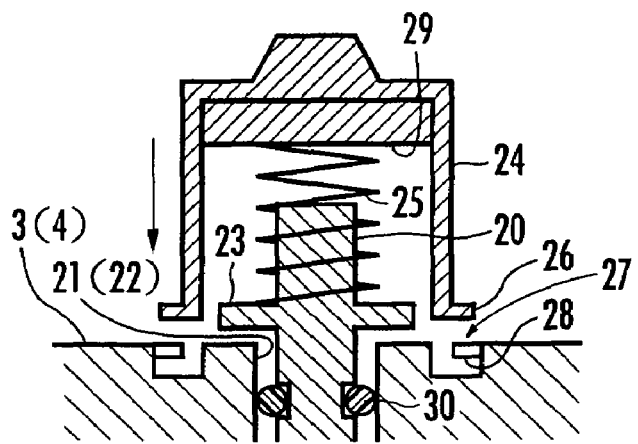
FIG. 3 is a set of schematic views illustrating the attaching procedures of connecting members in the electrolytic cell shown in FIG. 1.
Figure 3:
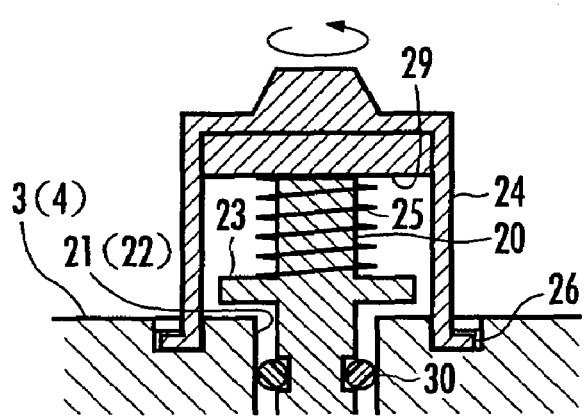
Figure 3:
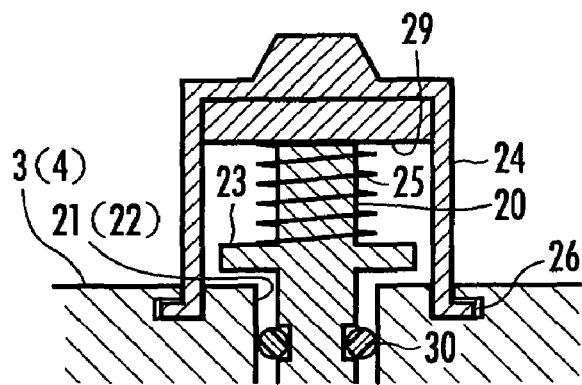

As shown in FIG. 3(A), the caps 24 are bottomed cylinders surrounding the outer peripheries of the shanks 20 projecting toward outside respectively from the electrolysis chamber cases 3 and 4; and the caps 24 have a plurality of guard-shaped portions 26 respectively formed intermittently in space along the peripheries of the open ends of the bottomed cylinders. On the other hand, the electrolysis chamber cases 3 and 4 respectively comprise a plurality of insertion holes 27 into which the guard-shaped portions 26 are inserted, and undercut portions 28 communicating one insertion hole 27 with another insertion hole 27.

When the terminals 17 and 18 are attached, for each of these terminals, at the beginning as shown in FIG. 3(A), the cap 24 is pressed toward the electrolysis chamber case 3 or 4 against the resilient force exerted by the spring 25 placed between the flange 23 of the shank 20 and the bottom 29 of the cap 24, and thus, the guard-shaped portions 26 are inserted into the insertion holes 27.

Next, in each of the terminals 17 and 18, when the guard-shaped portions 26 of the cap 24 have been inserted into the insertion holes 27, the cap 24 is turned along the circumferential direction as shown in FIG. 3(B); in this way, as shown in FIG. 3(C), the guard-shaped portions 26 are engaged as guided by the undercut portion 28 communicating one insertion hole 27 with another insertion hole 27. In this case, the resilient force of the spring 25 acts in such a direction that the bottom 29 of the cap 24 and the flange 23 of the shank 20 move away from each other.

Accordingly, the cap 24 is biased by the resilient force of the spring 25 acting toward the bottom 29, and the guard-shaped portions 26 are latched to the portion of the electrolysis chamber case 3 or 4 above the undercut portion 28 so as to be retained in a fixed position. On the other hand, each of the terminals 17 and 18 is biased by the resilient force of the spring 25 acting from the bottom 29 toward the flange 23, and consequently the terminals 17 and 18 are pressed respectively toward the current collectors 13 and 14.

Consequently, the current collectors 13 and 14 pressed by the terminals 17 and 18 are pressed to contact respectively with the electrodes 12a and 12b.

The terminals 17 and 18 are arranged respectively at the positions opposite to each other on both sides of the membrane-electrode assembly 2, so that it is possible to avoid the situation that a local pressure is exerted only on one of the current collectors 13 and 14. Consequently, both current collectors 13 and 14 are pressed at a uniform pressure respectively toward the electrodes 12a and 12b of the membrane-electrode assembly 2 so as to be surely brought into contact with the electrodes 12a and 12b.

It is to be noted that the terminals 17 and 18 are connected to the external electric power supply with the aid of unshown lead wires or the like, and an O-ring 30 is attached so as to interpose between one of the two shanks 20 and the through-hole 21, and another O-ring 30 is attached so as to interpose between the other shank 20 and the through-hole 22.

The electrolysis chamber cases 3 and 4 are clamped to each other with unshown bolts and unshown nuts to be screwed with the bolts in such a way that the electrolysis chambers 3 and 4 are pressed to be brought into contact with the membrane-electrode 2 through spacers 31 and packings 32.

In the electrolytic cell 1 of the present embodiment, for example, the electrode 12a is set as anode and the electrode 12b is set as cathode. In this setting, water containing almost no electrolyte as raw water is fed into the electrolysis chamber 5 through the raw water feed port 7, and brine (an aqueous solution of sodium chloride) as electrolyte-containing raw water is fed into the electrolysis chamber 6 through the raw water feed port 8. Then, current is applied to the electrodes 12a and 12b through the current collectors 13 and 14.

Consequently, an acidic electrolyzed water containing hypochlorous acid is obtained in the electrolysis chamber 5, and an alkaline electrolyzed water is obtained in the electrolysis chamber 6. The acidic electrolyzed water is taken out of the electrolysis chamber 5 through the electrolyzed water take-out port 9, and the alkaline electrolyzed water is taken out of the electrolysis chamber 6 through the electrolyzed water take-out port 10.

In this case, the electrodes 12a and 12b are formed as a single piece integrated with the anion exchange membrane 11 in such a way that the electrodes 12a and 12b adhere respectively to both surfaces of the anion exchange membrane 11, and accordingly the separation between both electrodes is very narrow. Consequently, the electric resistance between both electrodes is small and electrolysis can be carried out efficiently with a low voltage.

The current collectors 13 and 14 are respectively pressed by the protrusions 15 and 16 and by the terminals 17 and 18, and are thereby pressed to be brought into contact with the electrodes 12a and 12b. Accordingly, the contact areas of the current collectors 13 and 14 formed of titanium mesh respectively in relation to the electrodes 12a and 12b are large, and electric power is thereby uniformly supplied to the electrodes 12a and 12b. Consequently, sufficient electric power can be surely supplied from the current collectors 13 and 14 respectively to the electrodes 12a and 12b.

Figure 4:
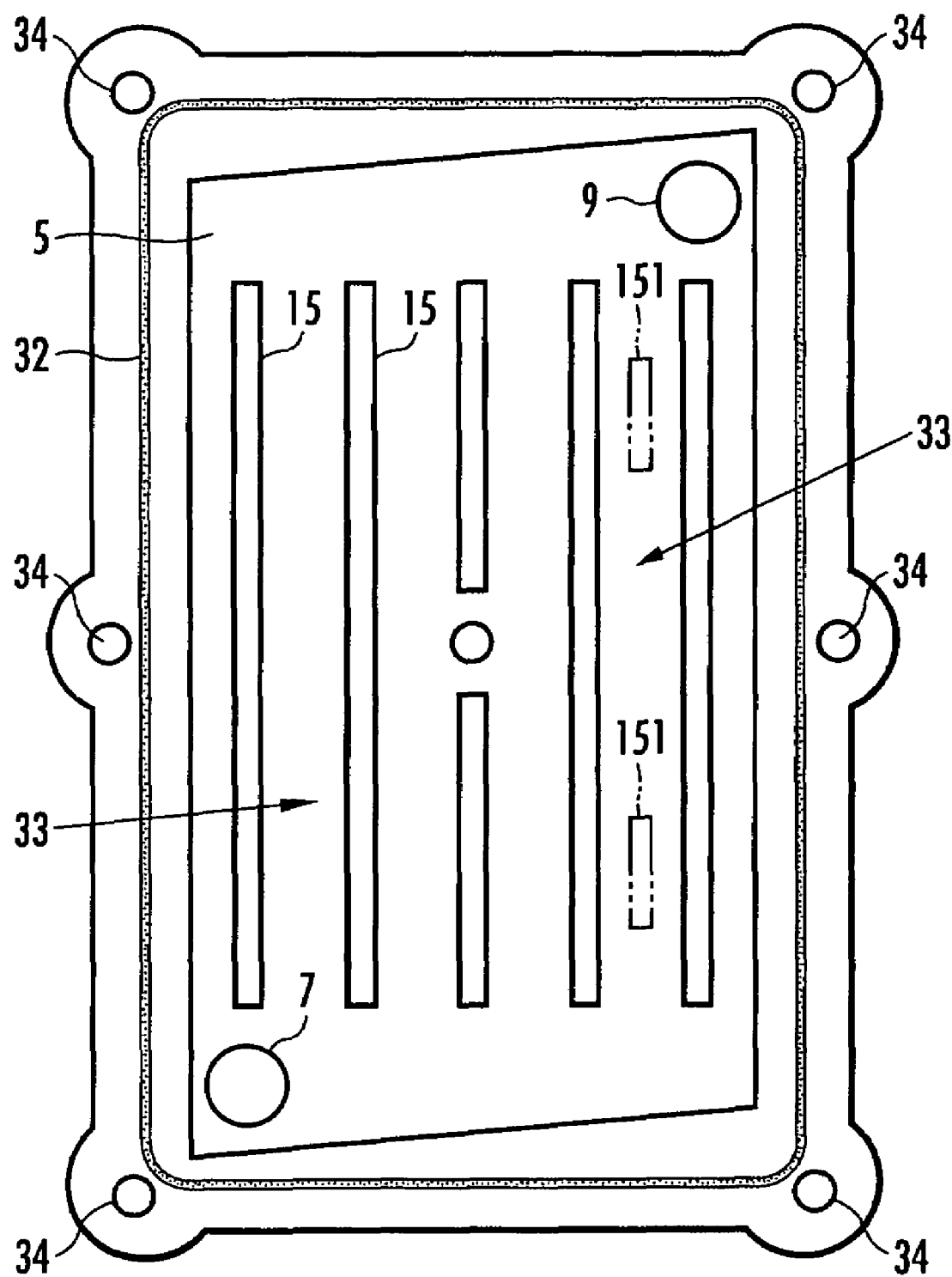
FIG. 4 is a plan view of the electrolysis chamber case as viewed from the membrane-electrode assembly shown in FIG. 1.

In the electrolytic cell 1 of the present embodiment, a plurality of the protrusions 15 and 16 are arranged. As shown as an example in FIG. 4, a plurality of the protrusions 15 are arranged parallel to each other along the length direction of the electrolysis chamber case 3, and a flow channel 33 for the acidic electrolyzed water is formed between one protrusion 15 and another protrusion 15 in the electrolysis chamber 5. However, the protrusions 15 may be formed in island shapes in the flow channel 33 as shown by virtual lines 151 in FIG. 4. Arrangement of island-shaped protrusions 15 makes it possible to improve the diffusion of ions in the acidic electrolyzed water.

The electrolysis chamber cases 3 and 4 are clamped to each other with bolts made to pass through bolt holes 34 formed in the outer peripheries of the electrolysis chamber cases 3 and 4 and with nuts to be screwed with the bolts in such a way that the electrolysis chamber cases 3 and 4 are pressed to be brought into contact with the membrane-electrode assembly 2 through spacers 31 and packings 32.

In the electrolytic cell 1 of the present embodiment, a plurality of the protrusions 15 and 16 are arranged respectively at the positions opposite to each other on both sides of the membrane-electrode assembly 2. However, no particular constraint is imposed on the positions of a plurality of the protrusions 15 and 16 as long as a plurality of the protrusions 15 and 16 can make the current collectors 13 and 14 be pressed to be respectively brought into contact with the electrodes 12a and 12b. In other words, a plurality of the protrusions 15 and 16 may not necessarily be arranged respectively at positions opposite to each other.

In the electrolytic cell 1 of the present embodiment, the terminals 17 and 18 are arranged respectively at the positions opposite to each other on the both sides of the membrane-electrode assembly 2. However, as shown in FIG. 5, in the electrolytic cell 1, on both sides of the membrane-electrode assembly 2, the terminal 17 may be arranged opposite to one of the protrusions 16, and the terminal 18 may be arranged opposite to one of the protrusions 15. Also in the structure shown in FIG. 5, similarly to the structure shown in FIG. 1, the current collectors 13 and 14 can avoid application of a local pressure only to one of the current collectors 13 and 14. Consequently, there can be obtained an advantageous effect that both current collectors 13 and 14 are pressed at a uniform pressure to be surely brought into contact with the electrodes 12a and 12b of the membrane-electrode assembly 2, respectively.

In the electrolytic cell 1 of the present embodiment, the anion exchange membrane 11 is used as the ion permeable diaphragm, but the present invention may also be embodied by using in place thereof a cation exchange membrane.

The electrolytic cell 1 of the present embodiment can constitute electrolyzed water generator by comprising peripheral units such as an electric power supply for supplying electric power to the electrodes 12a and 12b, a controller for controlling the operation of the raw water feed means.

What is claimed is:

1. An electrolytic cell for electrolyzed water generator, comprising:
  a pair of electrolysis chambers arranged opposite to each other through an ion permeable diaphragm;
  raw water feed means for providing water containing no electrolyte as raw water to one of the electrolysis chambers and providing electrolyte-containing raw water to another of the electrolysis chambers;
  a pair of electrodes respectively arranged in the electrolysis chambers in a manner sandwiching the diaphragm; and
  electrolyzed water take-out means for taking out electrolyzed water obtained by electrolyzing the raw water fed into each of the electrolysis chambers through the raw water feed means by applying a voltage to both electrodes, from each of the electrolysis chambers;
  the electrolytic cell comprising:
  a membrane-electrode assembly formed with each of the electrodes adhered to each surface of the diaphragm;
  mesh current collectors arranged respectively opposite to the electrodes of the membrane-electrode assembly; and
  a plurality of protrusions that are respectively arranged on the inner walls of the electrolysis chambers at positions opposite each other on both sides of the membrane-electrode assembly,
  wherein each of the plurality of protrusions are in direct contact with the mesh current collectors and press the mesh current collectors toward the electrodes so as to bring the mesh current collectors into pressure contact with the electrodes in order to obtain a pressing strength to supply sufficient electric power from the current collectors to the electrodes for electrolyzing by enlarging the contact area of the mesh current collectors and the electrodes.

2. The electrolytic cell for electrolyzed water generator according to claim 1, wherein the protrusions form flow channels for the electrolyzed water inside the electrolysis chambers.

3. The electrolytic cell for electrolyzed water generator according to claim 1, wherein the protrusions are formed in island shapes in the flow channels for the electrolyzed water inside the electrolysis chambers.

4. The electrolytic cell in electrolyzed water generator according to claim 1, comprising:

connecting members for connecting the mesh current collectors to an external electric power supply in a manner penetrating the outer walls of the electrolysis chambers; and resilient members for biasing the connecting members toward the mesh current collectors so as to bring the mesh current collectors into pressure contact with the electrodes.

5. The electrolytic cell for electrolyzed water generator according to claim 4, wherein the electrolysis chambers comprise the connecting members respectively at positions opposite to each other on both sides of the membrane-electrode assembly.

6. The electrolytic cell for electrolyzed water generator according to claim 1, wherein the current collectors are formed of a corrosion resistant conductive material.

7. The electrolytic cell for electrolyzed water generator according to claim 1, wherein the electrodes are formed of a porous material comprising a conductive powder.

8. The electrolytic cell for electrolyzed water generator according to claim 1, wherein each of the electrolysis chambers are formed at symmetric positions with reference to the membrane-electrode assembly.

9. The electrolytic cell for electrolyzed water generator according to claim 1, wherein the protrusions are formed integrally in the inner walls of both electrolysis chambers.

* * * * *